(12) United States Patent
Li et al.

(10) Patent No.: US 12,206,252 B2
(45) Date of Patent: Jan. 21, 2025

(54) TECHNIQUES FOR IMPROVED WIRELESS ENERGY TRANSMISSION EFFICIENCY

(71) Applicant: Analog Devices International Unlimited Company, Limerick (IE)

(72) Inventors: Wenwei Li, Nashua, NH (US); Eko Lisuwandi, Andover, MA (US); Brian James Shaffer, Lynnfield, MA (US)

(73) Assignee: Analog Devices International Unlimited Company, Limerick (IE)

( * ) Notice: Subject to any disclaimer, the term of this patent is extended or adjusted under 35 U.S.C. 154(b) by 88 days.

(21) Appl. No.: 17/871,714

(22) Filed: Jul. 22, 2022

(65) Prior Publication Data

US 2022/0393511 A1   Dec. 8, 2022

Related U.S. Application Data

(63) Continuation of application No. 16/857,943, filed on Apr. 24, 2020, now Pat. No. 11,431,201.

(60) Provisional application No. 62/901,049, filed on Sep. 16, 2019.

(51) Int. Cl.
*H02J 50/12* (2016.01)

(52) U.S. Cl.
CPC .................... *H02J 50/12* (2016.02)

(58) Field of Classification Search
CPC ....................................................... H02J 50/12
See application file for complete search history.

(56) References Cited

U.S. PATENT DOCUMENTS

| 5,929,598 | A | * | 7/1999 | Nakama | ............... | H02J 50/005 |
| | | | | | | 320/108 |
| 6,636,146 | B1 | | 10/2003 | Wehoski | | |
| 7,382,636 | B2 | * | 6/2008 | Baarman | ................ | H02J 50/12 |
| | | | | | | 363/40 |
| 7,733,979 | B2 | | 6/2010 | Schwartz et al. | | |
| 8,129,864 | B2 | | 3/2012 | Baarman et al. | | |
| 8,228,027 | B2 | | 7/2012 | Gao | | |
| 9,305,700 | B2 | | 4/2016 | Lisuwandi | | |
| 9,524,824 | B2 | | 12/2016 | Lisuwandi | | |
| 9,667,322 | B2 | * | 5/2017 | Walley | ............... | H02J 7/00034 |

(Continued)

FOREIGN PATENT DOCUMENTS

| CN | 107332301 A | 11/2017 |
| EP | 1972088 A2 | 9/2008 |

(Continued)

OTHER PUBLICATIONS

"U.S. Appl. No. 16/857,943, Final Office Action mailed Mar. 18, 2022", 18 pgs.

(Continued)

*Primary Examiner* — Daniel Kessie
*Assistant Examiner* — Terrence R Willoughby
(74) *Attorney, Agent, or Firm* — Schwegman Lundberg & Woessner, P.A.

(57) ABSTRACT

Techniques for improving efficiency of wireless power transfer to shunt-based receiver are provided. In an example, techniques can optimize wireless power transfer by comparing instantaneous peak voltage of a transmit coil of a wireless power transmitter to an average peak voltage of the transmit coil, and then, based on the comparison, adjust a setpoint of the wireless power transmitter to a more efficient level.

13 Claims, 7 Drawing Sheets

(56) References Cited

U.S. PATENT DOCUMENTS

| | | |
|---|---|---|
| 9,713,726 B1 | 7/2017 | Dellamano et al. |
| 9,825,485 B2 | 11/2017 | Lee et al. |
| 10,069,340 B2 | 9/2018 | Yeo et al. |
| 10,927,873 B1 | 2/2021 | Neal |
| 10,985,616 B2* | 4/2021 | Cimaz .................. H04B 5/79 |
| 11,431,201 B2 | 8/2022 | Li et al. |
| 2003/0042114 A1 | 3/2003 | Iizuka |
| 2008/0197802 A1 | 8/2008 | Onishi et al. |
| 2015/0191094 A1 | 7/2015 | Maekawa |
| 2015/0249359 A1* | 9/2015 | Gunderson ......... H02J 7/00712 |
| | | 320/108 |
| 2015/0249484 A1 | 9/2015 | Mach et al. |
| 2016/0211695 A1 | 7/2016 | Singer |
| 2017/0149291 A1 | 5/2017 | Iwasaki et al. |
| 2017/0187240 A1 | 6/2017 | Cho et al. |
| 2017/0250574 A1 | 8/2017 | Min et al. |
| 2017/0294808 A1 | 10/2017 | Azancot et al. |
| 2018/0101188 A1 | 4/2018 | Kurs et al. |
| 2018/0294672 A1 | 10/2018 | Zhong et al. |
| 2019/0207427 A1 | 7/2019 | Mcneally et al. |
| 2021/0083516 A1 | 3/2021 | Li et al. |

FOREIGN PATENT DOCUMENTS

| | | |
|---|---|---|
| EP | 2409378 B1 | 9/2015 |
| EP | 2643053 B1 | 8/2016 |
| JP | H06260977 A | 9/1994 |
| JP | 2001103683 A | 4/2001 |
| JP | 2005502233 A | 1/2005 |
| KR | 940009234 A | 5/1994 |
| WO | WO-2015087328 A1 | 6/2015 |

OTHER PUBLICATIONS

"U.S. Appl. No. 16/857,943, Non Final Office Action mailed Sep. 15, 2021", 20 pgs.

"U.S. Appl. No. 16/857,943, Notice of Allowance mailed Jun. 29, 2022", 10 pgs.

"U.S. Appl. No. 16/857,943, Response filed May 14, 2021 to Restriction Requirement mailed Mar. 16, 2021", 7 pgs.

"U.S. Appl. No. 16/857,943, Response filed May 18, 2022 to Final Office Action mailed Mar. 18, 2022", 10 pgs.

"U.S. Appl. No. 16/857,943, Response filed Dec. 15, 2021 to Non Final Office Action mailed Sep. 15, 2021", 9 pgs.

"U.S. Appl. No. 16/857,943, Restriction Requirement mailed Mar. 16, 2021", 7 pgs.

U.S. Appl. No. 16/857,943, filed Apr. 24, 2020, Techniques for Improved Wireless Energy Transmission Efficency.

* cited by examiner

TECHNIQUES FOR IMPROVED WIRELESS ENERGY TRANSMISSION EFFICIENCY

CLAIM OF PRIORITY

This application is a continuation of U.S. patent application Ser. No. 16/857,943, titled, TECHNIQUES FOR IMPROVED WIRELESS POWER TRANSMISSION EFFICIENCY, filed Apr. 24, 2020, which claims the benefit of priority to Li et al., U.S. Provisional Patent Application Ser. No. 62/901,049, titled, TECHNIQUES FOR IMPROVED WIRELESS POWER TRANSMISSION EFFICIENCY, filed Sep. 16, 2019, and are hereby incorporated by reference herein in their entirety.

TECHNICAL FIELD

This disclosure relates to wireless energy transfer, and more particularly, to techniques for more efficient wireless energy transfer.

BACKGROUND

Wireless energy transfer techniques such as for wireless charging is facing increasing demands for ministration as such techniques eliminates the need for cables or any exposed connectors on a device. For efficiency, some wireless transfer systems are arranged in a closed loop to allow the transmitter to actively adjust its output power based on the demands of its receiver and coupling coefficient between the two sides. Without such an arrangement, the receiver dissipates the extra power in the form of heat, impacting the user experience and posing a threat to the health of the battery. Digital communication from the receiver to the transmitter is usually used to close this loop, but it adds complexity in overall design, and increases the size of the application.

SUMMARY

Techniques for improving efficiency of wireless energy transfer are provided. In an example, a circuit for optimizing wireless energy transfer can include a comparator circuit configured to receive a first representation of an instantaneous peak voltage of a transmit coil of a wireless power transmitter, to receive a second representation of an average peak voltage of the transmit coil and to provide an output representing a result of a comparison of the first representation with the second representation, and a transistor configured to adjust a setpoint of the wireless power transmitter in response to an output of the comparator.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
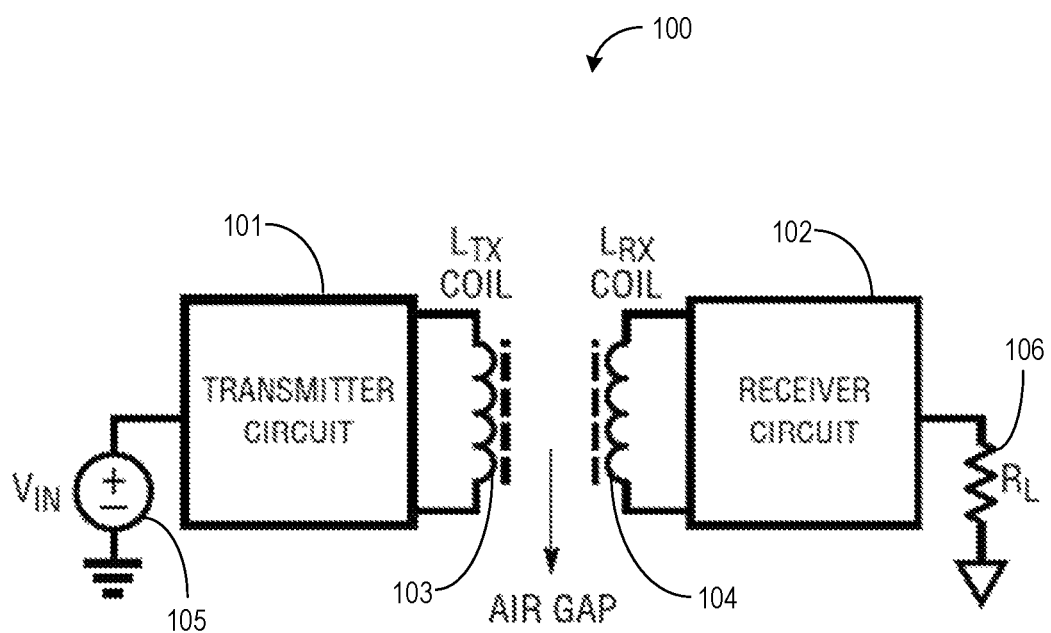
FIG. 1 illustrates generally an example wireless energy transfer system.

The present inventors have recognized techniques for closing the loop between the wireless energy receiver and the wireless energy transmitter, without the complexity of employing digital communication across the wireless link. In some examples, the wireless energy transmitter, or energy transmitter may be referred to as a wireless power transmitter or a power transmitter. Compared to convention digital communication methods the present subject matter can provide less complexity, external component count and smaller overall footprint on the receiver device. FIG. 1 illustrates generally an example wireless energy transfer system 100. In certain examples, the wireless energy transfer system 100 can include energy transmitter circuit 101, a power receiver circuit 102, a transmit coil 103 and a receiver coil 104. The wireless energy transfer system 100 can also include power supply 105 coupled to the energy transmitter circuit 101 during operation and a load 106 coupled to the power receiver circuit 102 during operation. During operation, when transmit and receive coils 103, 104 are in proximity to each other, the energy transmitter circuit 101 can use the power supply 105 to induce a varying magnetic field via the transmit coil 103. The varying magnetic field can induce current in the receiver coil 104 and the power receiver circuit 102 can harvest power from the induced current. As such, the wireless energy transfer system 100 can transfer power across the air gap between transmit and receive coils 103, 104.

In certain examples, the load 106 can be a power storage device such as a battery or a capacitor. In such an example, the power storage device can be a part of a mobile electronic device that may also include the power receiver circuit 102 and the receiver coil 104. In some examples, the load 106 can be an electronic circuit other than a storage device. In some examples, the load 106 can include both an electronic circuit and a storage device. In certain examples, the amount of power consumed by the load 106 can vary. Many conventional energy transfer systems are configured to provide power at one level at all times. When the load 106 demand is less that the power available from the energy transmitter circuit 101, the power receiver circuit 102 shunts the receiver coil current to prevent the output voltage from rising too high and dissipates some or all the extra power as heat. The present inventors have recognized that the voltage characteristics of the transmit coil 103 change when the power receiver circuit 102 shunts current of the receiver coil 104. In certain examples, the voltage characteristic of the transmit coil 103 can be monitored by the energy transmitter circuit 101 and used to adjust the amount of power provided by the energy transmitter circuit 101 via the transmit coil 103 so as to provide more efficient energy transfer for a varying load and to reduce thermal build-up in the power receiver circuit. In certain examples, the improvements can be accomplished without employing a digital communication scheme between the energy transmit circuit and the power receiver circuit.

Figure 2:
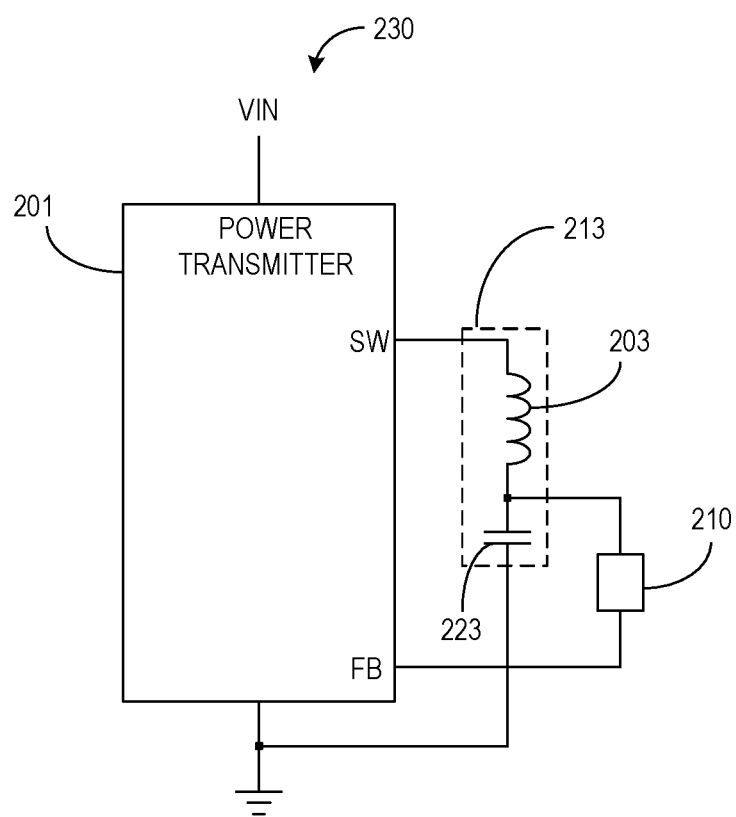
FIG. 2 illustrates generally a block diagram of an example energy transmit system including an energy transmitter circuit and transmit coil.

FIG. 2 illustrates generally a block diagram of an example energy transmit system 230 including an energy transmitter circuit 201 and transmit coil 203. In certain examples, the transmit coil 203 can be part of a series resonant tank 213 that can include a transmit capacitor 223. In certain examples, a switch output (SW) of the energy transmitter circuit 201 can selectively couple the series resonant tank 213 to the power rails (VIN, GND) to induce the magnetic field necessary for energy transfer. In certain examples, a feedback circuit 210 can be coupled to an intermediate node of the series resonance tank 213 to monitor a voltage of the series resonant tank 213 and provide a feedback signal (FB) to the energy transmitter circuit 201 that can be used to continuously modulate a duty cycle of the switch output (SW).

Figure 3:
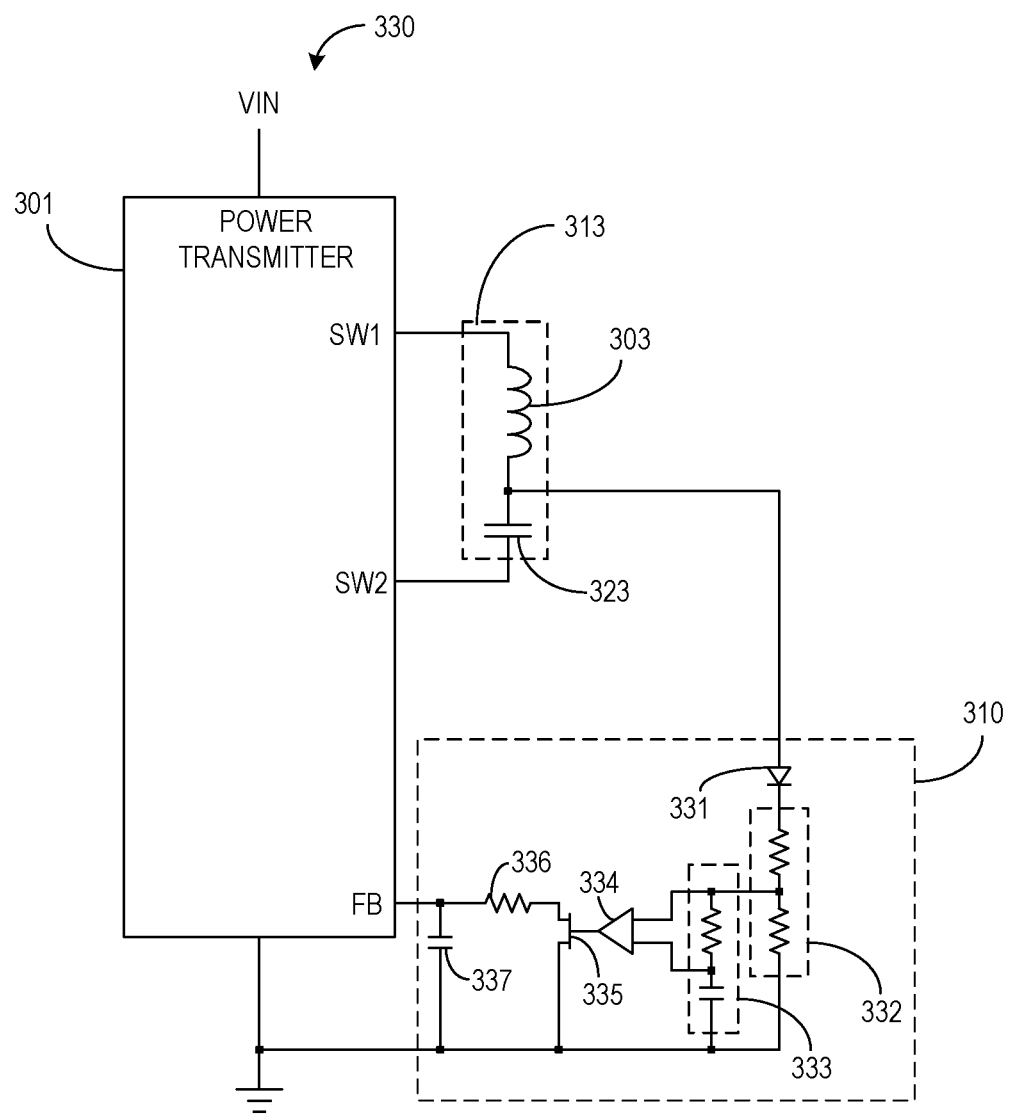
FIG. 3 illustrates generally an alternative example architecture of an example energy transmit system.

FIG. 3 illustrates generally an alternative example architecture of an example energy transmit system 330. FIG. 3 also provides a more detailed representation of an example feedback circuit 310. In certain examples, the energy transmit system 330 can include an energy transmitter circuit 301, a resonance tank 313 including a transmit coil 303 and a transmit capacitor 323, and the feedback circuit 310. In certain examples, the energy transmitter circuit 301 can include a full bridge switching circuit that can include two switch outputs (SW1, SW2) for selectively coupling each end of the resonance tank 313 to the power rails (VIN, GND). Such full-bridge power transmitter circuits can typically provide up to twice as much energy transfer compared to the half bridge architecture as shown in FIG. 2. In certain examples, a full bridge power transmitter circuit can be used in a half bridge mode or architecture.

In certain examples, the feedback circuit 310 can include a unidirectional pass device such as a diode 331 to sample a voltage of an intermediate node of the resonance tank 313. The feedback circuit 310 can include a voltage divider 332, and average network 333, a comparator 334, a switch 335, a current limiter such as a current limit resistor 336 and a storage capacitor 337. The voltage divider 332 can provide a scaled representation of the instantaneous peak voltage of the resonance tank 313 and can include two or more resistors coupled in series between the rectified intermediate node and ground. The average network 333 can include a current limit resistor and an averaging capacitor coupled to the voltage divider 332. The average network 333 can provide a scaled representation of an average peak voltage of the intermediate node of the resonance tank 313. The comparator 334 can compare the instantaneous peak voltage provide by the voltage divider 332 with the average peak voltage provided by the average network 333 and can provide a binary result of the comparison. The output of the comparator 334 can control a switch 335 coupled to the feedback node (FB) of the energy transmitter circuit 301.

The structure of the feedback circuit 310 as discussed above is intended to provide pulses at the output of the comparator 334 when the receiver power circuit shunts the current of the receiver coil. For example, when the receiver power circuit receives too much power from the energy transmitter circuit 301, the receiver power circuit will momentarily shunt the current of the receiver coil to prevent the output voltage from rising too high and to dissipate some or all of the excess power as heat. The frequency of the shunt events can increase as the difference between low power demand of the load and the wireless power received increases. When the power receiver circuit shunts current of the receiver coil, the linkage between the transmit coil 303 and the receiver coil changes such that the voltage at the intermediate node of the resonance tank 313 climbs or spikes during the shunt event. The spikes, or peaks in the instantaneous voltage of the intermediate node of the transmit resonance tank 313 of the energy transmitter circuit 301 can become greater than the average peak voltage of the intermediate node of the transmit resonance tank 313. At such times, the output of the comparator 334 can change states which can generally result in generation of a pulse at the output of the comparator 334. In certain examples, the pulse can activate or trip the switch 335.

When the switch 335 is tripped, the feedback node (FB) can be pulled low. When the feedback node (FB) is pulled low, a duty cycle of the switching scheme of the energy transmitter circuit 301 can be adjusted to reduce the wireless energy transfer provided by the transmit resonance tank 313. In certain examples, the current limit resistor 336 and storage capacitor 337 can be used to adjust a response of the duty cycle change. In certain examples, internal to the energy transmitter circuit 301, the feedback node (FB) can be coupled to a pull-up circuit such as a pull-up resistor. As such, when the feedback node (FB) is not being pulled low by the switch 335, the feedback node (FB) can be pulled up to a voltage level indicative of a maximum duty cycle, or maximum energy transfer set point, for the energy transmitter circuit 301.

Figure 4:
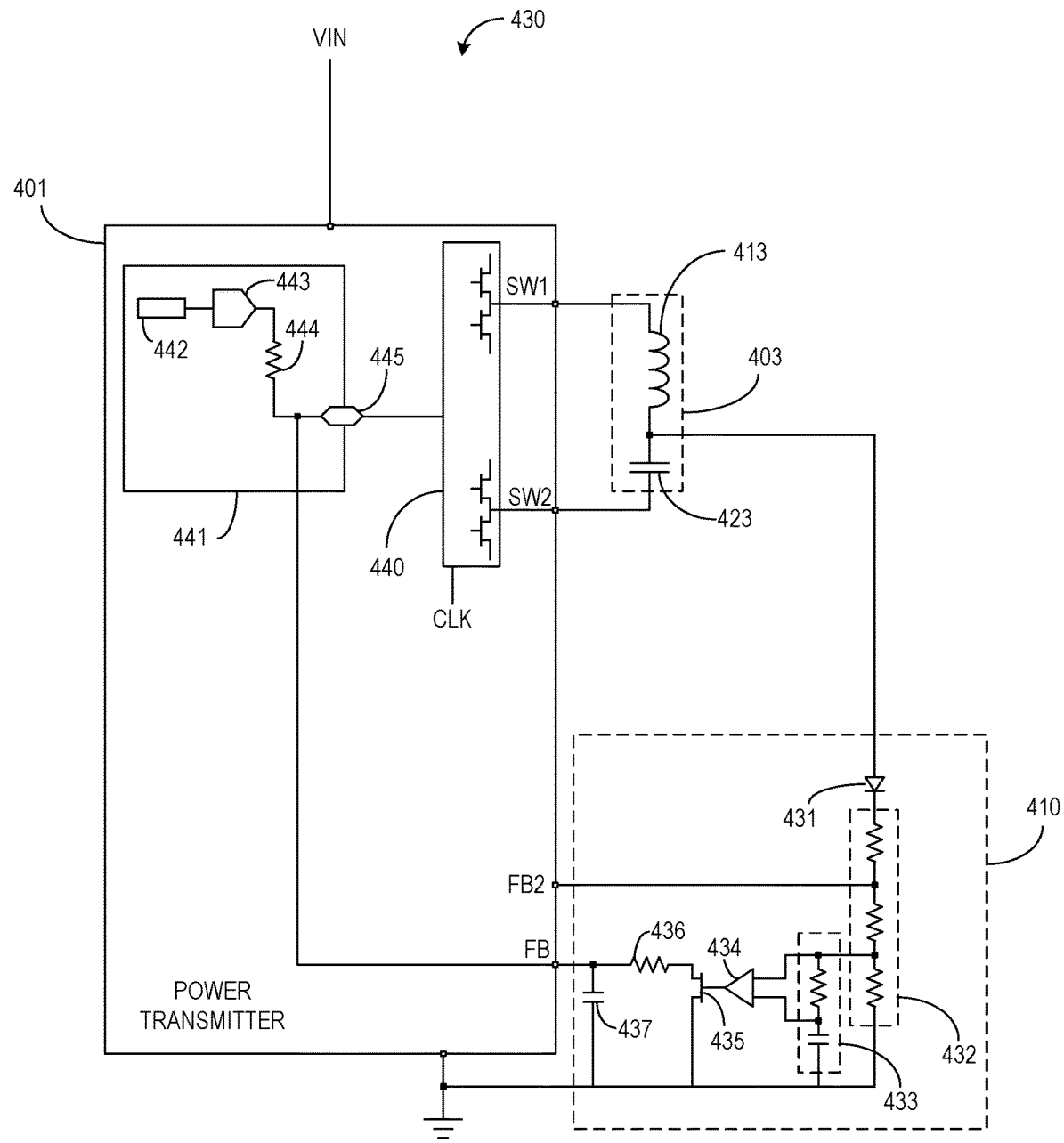
FIG. 4 illustrates generally an alternative example energy transmit system.

FIG. 4 illustrates generally an alternative example energy transmit system 430. In certain examples, the energy transmit system 430 can includes an energy transmitter circuit 401, a transmit resonance tank 403, and a feedback circuit 410. The energy transmitter circuit 401 can include switching logic 440 that includes a full bridge and two switch outputs (SW1, SW2) coupled to the transmit resonance tank 413. In certain examples, the feedback circuit 410 can include a unidirectional pass device such as a diode 431 to sample a voltage of an intermediate node of the resonance tank 413. The feedback circuit 410 can include a voltage divider 432, and average network 433, a comparator 434, a switch 435, a current limit 436 and a storage capacitor 437. The feedback circuit s operates as discussed above with respect to the example of FIG. 3.

In certain examples, the energy transmitter circuit 401 can include a controller 441. The controller 441 can include a digital processor, control logic, control circuitry, or combinations thereof. In certain examples, the controller 441 can include a register 442, a digital-to-analog converter (DAC) 443, and a pull-up resistor 444 to set a command signal for a duty cycle of the switching logic 440. The register 442 can define a maximum duty cycle and can be programmable in certain examples. The value of the register 442 can be converted to an analog signal such as a voltage by the DAC 443 and can be partially buffered from a setpoint terminal 445 by the pull-up resistor 444. As discussed above, the feedback circuit 410 can pull the setpoint terminal 445 lower by activating the switch 435 of the feedback circuit 410. In certain examples, activation of the switch 435 can take the form of cycling the switch 435 whenever the power receiver shunts current of the receiver coil. In certain examples, the voltage divider 432 can provide an additional, second feedback signal (FB2). In certain examples, the additional, optional, second feedback signal (FB2) can be used to by the controller 441 to adjust the value of the register 442 via a search routine with a much lower loop update than the closed loop control provided by the first feedback signal (FB). In some examples, the second feedback signal (FB2) can be used to provide over-voltage protection.

Figure 5A:
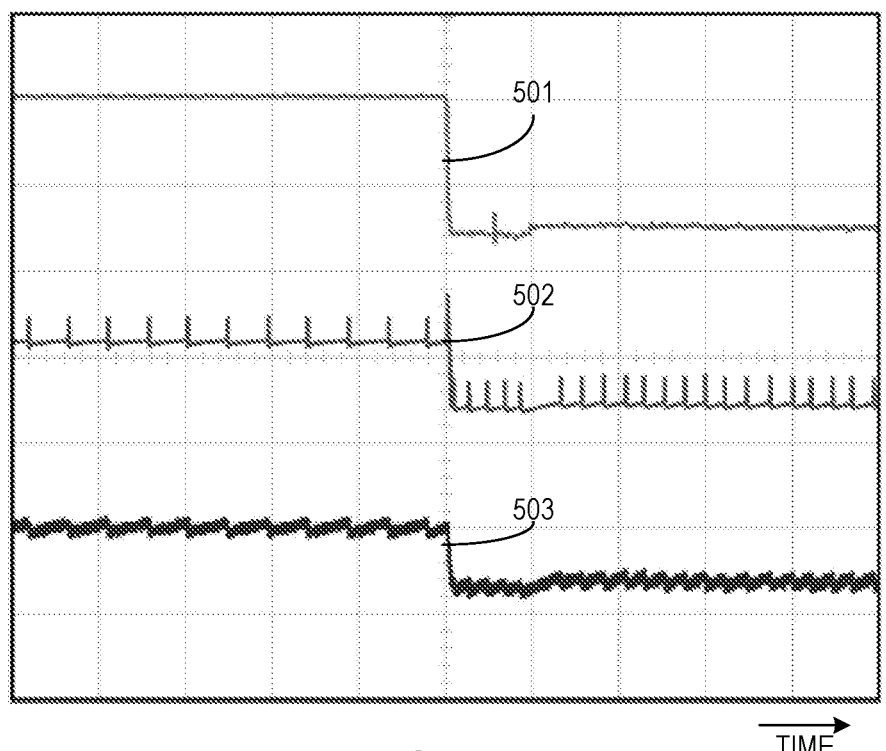
FIGS. 5A and 5B illustrates generally an example of the response of an energy transmit circuit as described above with respect to the examples, of FIGS. 1-4 as the power demand of the energy receiver circuit falls over time.
Figure 5B:
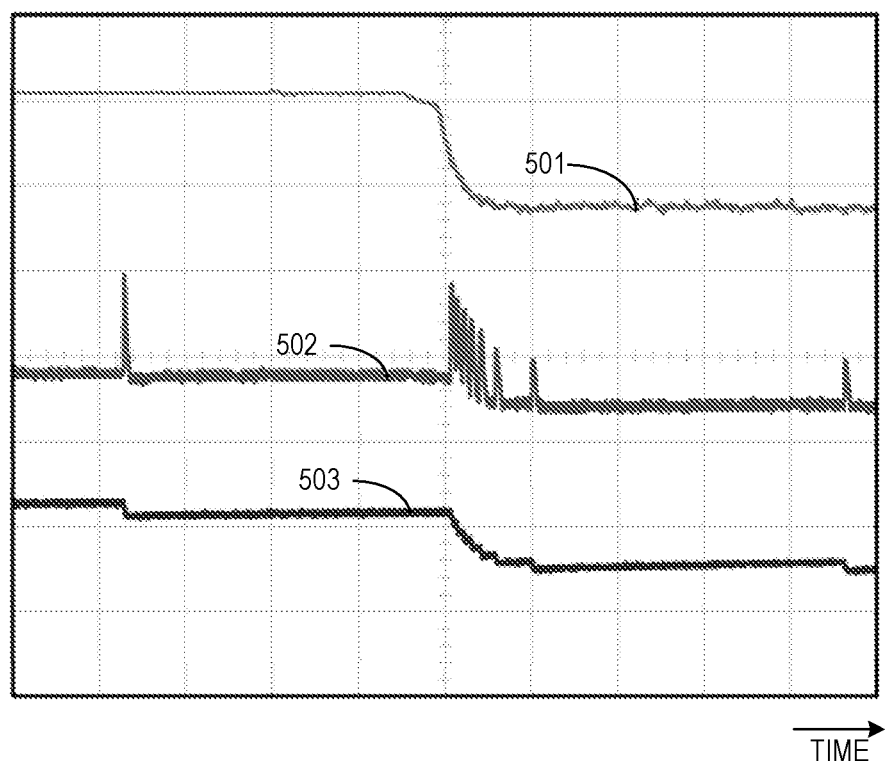

In certain examples, the energy transmitter circuit 401 can include the circuits for generating the resonant driving frequency discussed in Lisuwandi, U.S. Pat. No. 9,524,824 which is hereby incorporated by reference herein in its entirety. The techniques for generating the resonant driving frequency can assist in improving the response of the energy transmitter circuit 401 when combined with the techniques for adjusting the duty cycle based on the first feedback signal (FB) discussed above. FIGS. 5A and 5B illustrate generally an example of the response of an energy transmit circuit as described above with respect to the examples, of FIGS. 1-4 as the power demand of the power receiver circuit falls over time. FIGS. 5A and 5B show current demand 501 of power receiver circuit, the voltage 502 at the intermediate node of the transmit resonance tank, and the voltage 503 at the feedback node. As the power demand of the energy transmit receiver falls, the energy transmit receiver shunts the current of the receiver coil more often creating a high frequency pulse train activating the feedback switch circuit, that in turn significantly lowers the voltage at the feedback node (FB). As the proper balance of energy transmission is reached, the shunting events begin to occur at regular intervals. Because the rate of fall of the power demand is so great in FIG. 5A, it is difficult to clearly see the increased frequency of the shunt events and corresponding drop in the voltage at the feedback node. FIG. 5B illustrates the same drop in power demand as in FIG. 5A in a relatively expanded time scale. The expanded time scale clearly shows that as the power demand of the load falls, the frequency of the shunt events increases and the voltage of the feedback node (FB) falls.

Figure 5C:
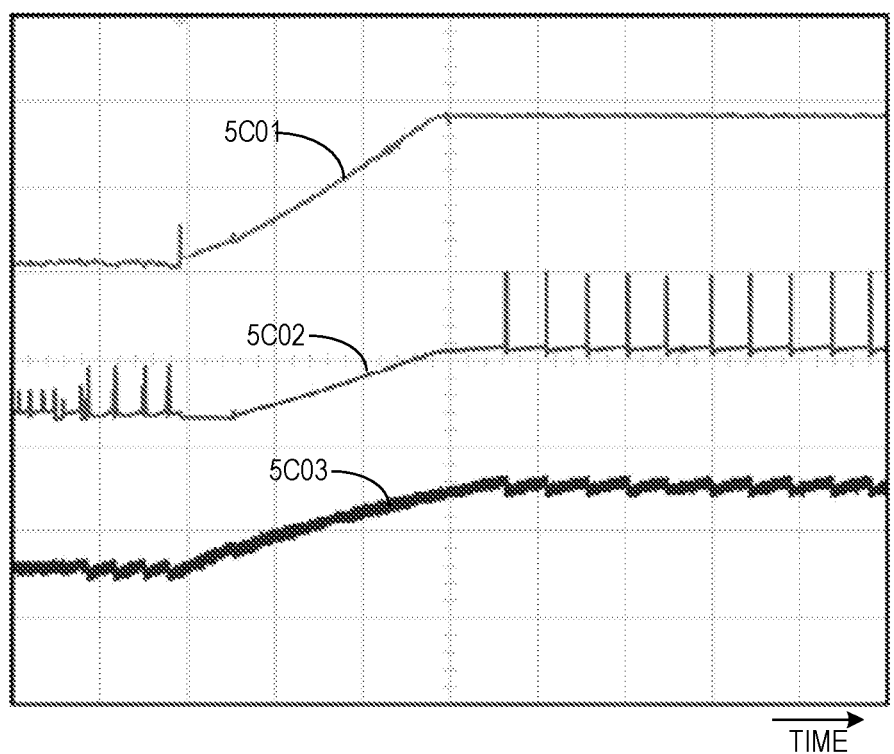
FIG. 5C illustrates generally an example of the response of an energy transmit circuit as described above with respect to the examples, of FIGS. 1-4 as the power demand of the energy receiver circuit rises over time.

FIG. 5C illustrates generally an example of the response of an energy transmit circuit as described above with respect to the examples, of FIGS. 1-4 as the power demand of the power receiver circuit rises over time. FIG. 5C shows current demand 501 of power receiver circuit, the voltage 502 at the intermediate node of the transmit resonance tank, and the voltage 503 at the feedback node. As the power demand of the energy transmit receiver rises, the energy transmit receiver does not shunt the current of the receiver coil as often. When the feedback switch is not activated, the feedback node (FB) is ramped and pulled to a value indicative of a maximum duty cycle. When the duty cycle adjusts to provide adequate energy transfer to the power receiver, the shunting events begin to occur at regular intervals.

Figure 6:
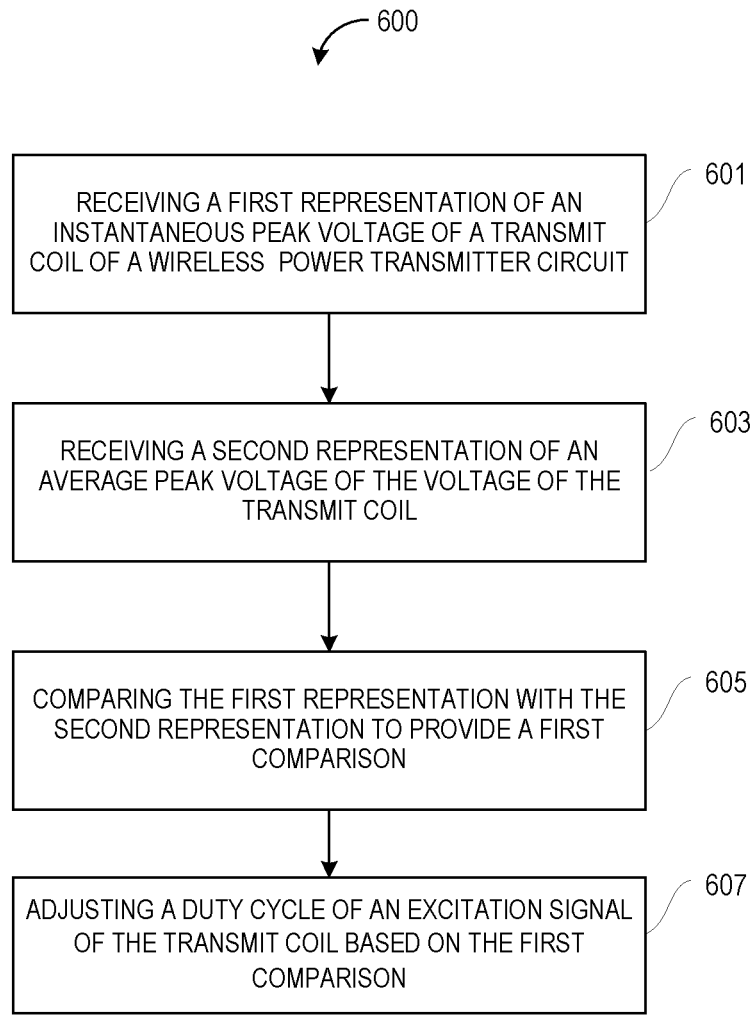
FIG. 6 illustrates generally a flowchart of an example method of operating an energy transmit circuit of wireless energy transfer system according to the present subject matter.

FIG. 6 illustrates generally a flowchart of an example method 600 of operating an energy transmit circuit of wireless energy transfer system according to the present subject matter. At 601, a first representation of an instantaneous peak voltage of the intermediate node of the transmit resonance tank can be received at a comparator of a feedback circuit. The transmit resonance tank can include a transmit coil and a transmit capacitor. When the transmit coil is properly excited with an electrical signal and is in close proximity to a receiver coil of a power receiver circuit, power can be transferred from the transmit coil to the receiver coil to power a load connected to the power receiver circuit. At 603, a second representation of an average peak voltage of the intermediate node of the transmit resonance tank can be received at the comparator. At 605, the comparator can compare the first representation with the second representation. When the power receiver circuit is receiving more power than is required to operate the load, the power receiver circuit can shunt current of the receiver coil to prevent the output voltage from rising too high and to dissipate some or all the extra power via heat. The shunting action can result in a voltage spike in the instantaneous voltage of the intermittent node of the transmit resonance tank. Likewise, the first representation can experience a spike in value that can cause the first representation to exceed the second representation and the output of the comparator can toggle or create a pulse. At 607, the result of the comparison can adjust a duty cycle of the excitation signal of the transmit resonance tank such that the energy transfer is adjusted to more closely resemble the power demand of the load. In certain examples, the duty cycle of the transmit power circuit can be configured to constantly ramp to a higher duty cycle in the absence of the feedback circuit detecting a new shunt event of the power receiver circuit. In certain examples, efficient operation of the system is achieved when the shunt events occur at regular, spaced apart intervals.

Notes

In Example 1, a system can include a wireless power transmitter configured to electrically excite a transmit coil with a pulse train to transmit power, the pulse train having a duty cycle, wireless power receiver configured to wirelessly receive the power from the wireless power transmitter, a load electrically and mechanically coupled to the wireless power receiver and configured to receive power form the wireless power receiver, and a feedback circuit. The feedback circuit can include a network configured to provide an instantaneous representation of a peak voltage of the transmit coil and an average representation of the peak voltage of the transmit coil, and a comparator circuit configured to compare the instantaneous representation with the average representation and to provide an output configured to adjust the duty cycle.

In Example 2, the comparator circuit of Example 1 optionally includes a comparator configured to receive the instantaneous representation and the average representation, and a transistor configured to divert current from a setpoint of the wireless power transmitter in response to an output of the comparator.

In Example 3, the network of any one or more of Examples 1-2 optionally includes a first branch configured to provide the instantaneous representation and a second branch configured to provide the average representation.

In Example 4, the first branch of any one or more of Examples 1-3 optionally includes a voltage divider.

In Example 5, the second branch of any one or more of Examples 1-4 optionally includes a capacitor.

In Example 6, a first node of the first branch and a first node of the second branch of any one or more of Examples 1-5 optionally are coupled directly to a supply rail of the wireless power transmitter.

In Example 7, a second node of the first branch of any one or more of Examples 1-6 optionally is configured to electrically couple with the transmit coil.

In Example 8, a second node of the second branch of any one or more of Examples 1-7 optionally is coupled to an intermediate node of the first branch.

In Example 9, the system of any one or more of Examples 1-8 optionally includes a diode configured to couple the network with the transmit coil.

In Example 10, a circuit for optimizing wireless power transfer can include a comparator circuit configured to receive a first representation of an instantaneous peak voltage of a transmit coil of a wireless power transmitter, to receive a second representation of an average peak voltage of the transmit coil and to provide an output representing a result of a comparison of the first representation with the second representation, and a transistor configured to adjust a setpoint of the wireless power transmitter in response to an output of the comparator.

In Example 11, the circuit of any one or more of Examples 1-10 optionally a passive network configured to electrically couple with the transmit coil, the passive network configured to provide the first representation and the second representation.

In Example 12, the passive network of any one or more of Examples 1-11 optionally includes a first branch configured to provide the first representation and a second branch configured to provide the second representation.

In Example 13, the first branch of any one or more of Examples 1-12 optionally includes a voltage divider, and the second branch of any one or more of Examples 1-12 optionally includes a capacitor.

In Example 14, a first node of the first branch and a first node of the second branch of any one or more of Examples 1-13 optionally are coupled directly to a supply rail of the wireless power transmitter.

In Example 15, a second node of the first branch of any one or more of Examples 1-14 optionally is configured to electrically couple with the transmit coil.

In Example 16, a second node of the second branch of any one or more of Examples 1-15 optionally is coupled to an intermediate node of the first branch.

In Example 17, the circuit of any one or more of Examples 1-12 optionally include a diode configured to couple the passive network with the transmit coil.

In Example 18, a method of adjusting a wireless power transfer can include receiving a first representation of an instantaneous peak voltage of a voltage of a transmit coil, receiving a second representation of an average peak voltage of the voltage of the transmit coil, comparing the first representation with the second representation to provide a first comparison, and adjusting a duty cycle of an excitation signal of the transmit coil based on the first comparison.

In Example 19, the method of any one or more of Examples 1-18 optionally increasing the duty cycle of the excitation signal between comparisons of the first representation and the second representation.

In Example 20, the adjusting the duty cycle of any one or more of Examples 1-19 optionally includes reducing the duty cycle.

In Example 21, a system can include a load configured to receive power for operation, the load including a wireless energy receiver configured to receive first energy wirelessly via a receive inductor and to shunt the receive inductor to dissipate excess wireless energy, wherein the power is derived from the first energy, and a wireless energy transfer management circuit for managing wireless energy transfer from a wireless energy transmitter to the wireless energy receiver. The wireless energy management circuit can include a wireless energy transmitter including a transmit inductor, and a transmit energy control input configured to adjust a level of wireless energy transfer by the wireless energy transmitter in response to an indication, at the transmit inductor, of an occurrence of shunting of the excess wirelessly energy.

In Example 22, a wireless energy transfer management circuit for managing wireless energy transfer from a wireless energy transmitter to a wireless energy receiver having incoming wireless energy shunting capability can include a wireless energy transmitter including a transmit inductor, and a transmit energy control input configured to adjust wireless energy transfer by the wireless energy transmitter in response to an indication, at the transmit inductor, of an occurrence of shunting of wirelessly transferred energy away from a load that is electrically coupled to a wireless energy receive inductor of the wireless energy receiver.

In Example 23, the wireless energy transmitter of any one or more of Examples 1-22 optionally includes a receiver shunt detector configured to provide the indication in response to a voltage spike on the transmit inductor.

In Example 24, the wireless energy transmitter of any one or more of Examples 1-23 optionally is configured to incrementally increase a duty cycle of an excitation signal of the transmit inductor.

In Example 25, the receiver shunt detector of any one or more of Examples 1-24 optionally includes a comparator configured to generate the indication.

In Example 26, the wireless energy transmitter of any one or more of Examples 1-25 optionally is configured reduce the duty cycle in response to a pulse output of the comparator received at the transmit energy control input.

In Example 27, the comparator of any one or more of Examples 1-26 optionally is configured to receive a first representation of an instantaneous peak voltage of the transmit inductor and to receive a second representation of an average peak voltage of the transmit inductor.

In Example 28, the comparator of any one or more of Examples 1-27 optionally is configured to provide a pulse output in response to the first representation exceeding the second representation.

In Example 29, the wireless energy transmitter of any one or more of Examples 1-28 optionally is configured to reduce a duty cycle of an excitation signal of the transmit inductor in response to the indication.

In Example 30, the wireless energy transmitter of any one or more of Examples 1-29 optionally is configured to incrementally increase the duty cycle absent the indication of the occurrence of shunting.

In Example 31, a method of operating a wireless power transmitter can include transmitting energy to a receiver device using a transmit inductor, detecting a shunt event of the receiver device via a voltage spike on the transmit inductor, and adjusting level of energy transfer to the receiver in response to the shunt event.

In Example 32, the method of any one or more of Examples 1-31 optionally include incrementing the level of energy transfer to the receiver device absent detection of a shunt event at the receiver device.

In Example 33, the transmitting energy to the receiver device of any one or more of Examples 1-32 optionally includes exciting the transmit inductor with an excitation signal having a duty cycle, wherein a higher duty cycle is configured to transmit a higher level of energy compared to a lower duty cycle.

In Example 34, the detecting a shunt event of any one or more of Examples 1-33 optionally includes comparing a first representation of an instantaneous peak voltage of the transmit inductor with a second representation of average peak voltage of the transmit inductor.

In Example 35, the detecting a shunt event of any one or more of Examples 1-34 optionally includes providing a pulse output in response to the first representation exceeding the second representation.

In Example 36, the adjusting the level of energy transfer of any one or more of Examples 1-35 optionally includes reducing a duty cycle of an excitation signal of the transmit inductor, wherein a higher duty cycle is configured to transmit a higher level of energy compared to a lower duty cycle.

In Example 37, the reducing the duty cycle of any one or more of Examples 1-36 optionally includes biasing a duty cycle setpoint in response a pulse representation of the shunt event.

In Example 38, a circuit for optimizing wireless energy transfer to a shunting receiver can include a wireless energy transmitter configured to excite a transmit inductor with an excitation signal having a duty cycle, means for providing a duty cycle setpoint for the duty cycle, means for detecting a shunt event at the circuit; and means for adjusting the duty cycle setpoint in response to the shunt event.

In Example 39, the means for providing a duty cycle setpoint of any one or more of Examples 1-38 optionally include a digital-to-analog converter configured to receive a digital setpoint and to provide an analog setpoint to the wireless energy transmitter.

In Example 40, the means for adjusting the duty cycle of any one or more of Examples 1-39 optionally includes a transistor configured to bias an output of the means for providing a duty cycle in response to an output of the means for detecting a shunt event.

In Example 41, the means for adjusting the duty cycle of any one or more of Examples 1-40 optionally includes a capacitor configured to limit a change of the output of the means for providing a duty cycle.

In Example 42, the means for detecting includes means for comparing an instantaneous peak voltage of the transmit coil with an average peak voltage of the transmit coil and means for providing a pulse output when the instantaneous peak voltage is greater than the average peak voltage.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein may be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A wireless energy transmitter circuit, for wirelessly transmitting wireless energy to a wireless energy receiver circuit having a receive coil and configured with incoming wireless energy shunting capability, the wireless energy transmitter circuit capable of wirelessly detecting incoming wireless energy shunting events occurring at the wireless energy receiver circuit, the wireless energy transmitter circuit comprising:
   a transmit coil, having a transmit inductance, for transmitting wireless energy to the wireless energy receiver circuit via an inductive linkage between the transmit coil and the receive coil;
   a transmit capacitor, having a transmit capacitance, electrically connected with the transmit coil, to form a tank circuit with the transmit coil, at an intermediate node of the tank circuit, wherein an intermediate node signal characteristic varies based on a change in the inductive linkage between the transmit coil and the receive coil that is responsive to an occurrence of energy shunting events occurring at the wireless energy receiver circuit; and a feedback circuit including an analog comparator, wherein the feedback circuit is electrically connected with the intermediate node to use the intermediate node signal characteristic to generate a feedback control signal for adjusting energization of the transmit coil toward reducing the energy shunting events occurring at the wireless energy receiver circuit, wherein the feedback circuit is configured for adjusting a duty cycle of an excitation signal of the transmit coil in response to an output of the comparator, the feedback circuit further including:

a switch having a control terminal coupled with an output of the comparator, wherein the switch is coupled with a feedback node of a power transmitter, wherein the comparator includes a first state and a second state, wherein in the first state, the comparator responds to the occurrence of energy shunting events and generates a first output to the control terminal of the switch to modify a voltage at the feedback node to reduce the duty cycle of the excitation signal, and wherein in the second state, the comparator responds to an absence of the occurrence of energy shunting events and generates a second output to the control terminal of the switch to modify the voltage at the feedback node to increase the duty cycle of the excitation signal.

2. The wireless energy transmitter circuit of claim 1, wherein the the comparator is configured to compare an indication of a transient value of the intermediate node signal characteristic to an averaged or otherwise lowpass filtered value of the intermediate node signal characteristic and, based on the comparison, to generate the feedback control signal for adjusting energization of the transmit coil toward reducing the energy shunting events occurring at the wireless energy receiver circuit.

3. The wireless energy transmitter circuit of claim 2, wherein the feedback circuit includes a voltage divider circuit, coupled to the intermediate node of the tank circuit.

4. The wireless energy transmitter circuit of claim 2, wherein the feedback circuit includes an averaging or other lowpass filter circuit, coupled to the intermediate node of the tank circuit.

5. The wireless energy transmitter circuit of claim 2, wherein an output of the comparator is coupled to an input of a transistor that is coupled to a capacitor having a terminal providing the feedback control signal and the transistor is electrically connected via a current-limiting electronic component to the terminal of the capacitor providing the feedback control signal.

6. The wireless energy transmitter circuit of claim 3, wherein the feedback circuit includes a diode or other unidirectional current pass device, coupled to the intermediate node of the tank circuit.

7. The wireless energy transmitter circuit of claim 1, wherein the feedback circuit configured for adjusting the duty cycle of an excitation signal of the transmit coil in response to an output of the comparator is configured for:
 (i) reducing a duty cycle of an excitation signal of the transmit coil in response to indication of an occurrence of shunting; and
 (ii) incrementally increase the duty cycle of the excitation signal of the transmit coil absent indication of an occurrence of shunting.

8. A wireless energy transfer management circuit for managing wireless energy transfer from a wireless energy transmitter to a wireless energy receiver having incoming wireless energy shunting capability, the circuit comprising:
 the wireless energy transmitter including:
  a transmit inductor;
  a transmit energy control input configured to adjust wireless energy transfer by the wireless energy transmitter in response to an indication, a feedback circuit including a resonant tank circuit including the transmit inductor, of an occurrence of shunting of wirelessly transferred energy away from a load that is electrically coupled to a wireless energy receive inductor of the wireless energy receiver; and
  a feedback circuit, including a comparator and a switch having a control terminal coupled with an output of the comparator, wherein the switch is coupled with a feedback node of a power transmitter, wherein the comparator includes a first state and a second state,
  wherein in the first state, the comparator responds to the occurrence of energy shunting events and generates a first output to the control terminal of the switch to modify a voltage at the feedback node to reduce a duty cycle of an excitation signal of the transmit inductor, and
  wherein in the second state, the comparator responds to an absence of the occurrence of energy shunting events and generates a second output to the control terminal of the switch to modify the voltage at the feedback node to increase the duty cycle of the excitation signal.

9. The circuit of claim 8, wherein the feedback circuit is configured to provide the indication in response to a voltage spike on the transmit inductor.

10. The circuit of claim 8, wherein the feedback circuit includes a voltage divider circuit, coupled to an intermediate node of the tank circuit.

11. The circuit of claim 8, wherein the comparator is configured to generate the indication based on a relationship between an instantaneous peak voltage and an average peak voltage at the transmit inductor.

12. The circuit of claim 8, wherein the comparator is configured to receive a first representation of an instantaneous peak voltage of the transmit inductor and to receive a second representation of an average peak voltage of the transmit inductor.

13. The circuit of claim 12, wherein the comparator is configured to provide a pulse output in response to the first representation exceeding the second representation.

* * * * *